United States Patent [19]

Glaubitt et al.

[11] Patent Number: 5,656,073
[45] Date of Patent: Aug. 12, 1997

[54] MOLDED ARTICLE BASED ON PZT (PB(ZR, TI)0₃, LEAD ZIRCONATE-LEAD TITANATE), METHOD AND INTERMEDIATE PRODUCT FOR ITS MANUFACTURE

[75] Inventors: Walther Glaubitt; Rainer Jahn, both of Veitshoechheim; Stephan Merklein, Wuerzburg, all of Germany

[73] Assignee: Fraunhofer-Gesellschaft zur Forderung der Angewandten Forschung e.V., Munich, Germany

[21] Appl. No.: 683,825

[22] Filed: Jul. 18, 1996

Related U.S. Application Data

[62] Division of Ser. No. 311,428, Sep. 23, 1994, Pat. No. 5,578,539.

[30] Foreign Application Priority Data

Sep. 27, 1993 [DE] Germany .......................... 43 32 831.8

[51] Int. Cl.⁶ .................. C07F 7/28; C04B 35/49
[52] U.S. Cl. .................. 106/287.19; 501/134; 501/136; 501/137
[58] Field of Search .................. 106/287.19; 501/134, 501/136, 137

[56] References Cited

U.S. PATENT DOCUMENTS 5,072,035 12/1991 Chen et al. .......................... 262/62.9
5,578,539 11/1996 Glaubitt et al. .......................... 501/134

OTHER PUBLICATIONS

Materials Reasearch Society, Symp. Proc. vol. 271, (1992), pp. 517–523.

*Primary Examiner*—David Brunsman
*Attorney, Agent, or Firm*—Michael J. Striker

[57] ABSTRACT

The intermediate product which is used in a method of making a molded article, especially an endless PZT fiber, is itself made by a method including mixing an organic zirconium compound, $Zr(OR^1)_4$, and an organic titanium compound, $Ti(OR^2)_4$, $R^1$ and $R^2$ being $C_1$- to $C_{10}$-alkyl groups, separately or together with 0 to 4 moles of at least one alcohol of the formula $R^3$—X—$R^4$—OH or $R^3$—CX—$R^4$—OH, X being O, S or an amine group and $R^3$ and $R^4$ being $C_1$- to $C_{10}$-alkyl groups, per mole of the zirconium and titanium compounds; reacting the zirconium and titanium compounds in the resulting mixture or mixtures with one to three moles of at least one $C_2$- to $C_{10}$-carboxylic acid per mole of the zirconium and titanium compounds to form at least one reaction mixture; mixing the at least one reaction mixture and reacting with 1 to 1.5 moles of one or more Pb(II)-carboxylates and/or Pb(IV)-carboxylates per mole of the zirconium and titanium compounds to form a combined mixture; subjecting this combined mixture to a hydrolytic condensation and then removing the volatile components from it to form a solid mass at ambient temperatures.

8 Claims, No Drawings

MOLDED ARTICLE BASED ON PZT (PB(ZR, TI)0₃, LEAD ZIRCONATE-LEAD TITANATE), METHOD AND INTERMEDIATE PRODUCT FOR ITS MANUFACTURE

This is a divisional application of prior application Ser. No. 08/311,428 filed on Sep. 23, 1994 now U.S. Pat. No. 5,578,539.

BACKGROUND OF THE INVENTION

The present invention relates to a molded article based on PZT ($Pb(Zr_x,Ti_y)O_3$, Lead zirconate-lead titanate, with $x+y=1$), and a method and intermediate product for making it. More particularly, the invention relates to a method of making PZT endless fibers.

Lead zirconate ($PbZrO_3$) and lead titanate ($PbTiO_3$) form a continuous series of mixed crystals having a Perovskite-similar structure. Polycrystalline lead zirconate-titanate (Pb(Zr,Ti)$O_3$, PZT) is an important ferroelectric material, for which numerous electronic applications exist because of its attractive dielectric, piezoelectric and electro-optical properties.

Many application-relevant ferroelectric properties attain their optimum values in the vicinity of the morphotropic phase boundary between the zirconate-rich rhombohedral modification and the titanate-rich tetragonal modification.

Besides variation of properties by changing the Zr/Ti ratio, the properties of this material can be varied by changing the crystallite size, by doping and by partial or complete substitution of individual components.

In doping small quantities of foreign ions with varying charges are added(usually less than 10%), which modify the crystal structure. A great variety of metal ions can be used as doping agents, e.g. $La^{3+}$, $Nd^{3+}$, $Sb^{3+}$, $Bi^{3+}$, $Th^{3+}$, $Nb^{5+}$, $Sb^{5+}$, $W^{6+}$, $Na^+$, $Fe^{3+}$, $Fe^{2+}$, $Co^{3+}$, $Co^{2+}$, etc. The doping with lanthanum improves the optical properties significantly (transparency, double refraction), so that PLZT-materials above all are of significance for electro-optical applications.

The structure and thus the properties of these materials change also when the Pb, Zr or Ti ions present are replaced by ions having a different ionic radius. $Pb^{2+}$ is frequently replaced by an alkaline earth ion ($Mg^{2+}$, $Ca^{2+}$, $Sr^{2+}$, $Ba^{2+}$) and $Ti^{4+}$, $Zr^{4+}$ may be replaced by, e.g., $Sn^{4+}$ and $Hf^{4+}$.

For innovative applications of ferroelectric materials in composite materials PZT-long fibers, which can perform sensor or also actuator functions, are interesting materials. The manufacture of PZT-fibers has been the subject of research for several years. There are three different methods:

Precursor Methods (by a Sol-Gel Process). A precursor sol is obtained by addition of water to a methanol solution of $Pb(OAc)_2 \cdot 3H_2O$, $Zr(OPr^n)_4$, $Ti(OPr^i)_4$, from which a viscous fluid is obtained after removal of volatile components, from which a 1 m long fiber can be drawn in manual experiments. Polyvinylpyrrolidone is worked into the spinning mass to improve the fiber drawing properties and PZT-powder is worked into it to make a thick, porous fiber(Mat. Res. Soc. Symp. Proc., 271, pp. 517–523 (1992)). This process is disadvantageous since only fibers of insufficient length can be made by it. An additional disadvantage is that the process operates using a solvent and in connection with a drying process for removal of the solvent so that the solvent must be disposed of.

Extrusion Methods. Commercial PZT-powder (e.g. PZT 501A, Ultrasonic Powders Inc.) is worked into a 20% by weight polyvinylalcohol solution, which is extruded and the extrudate sintered. If it is sintered at low temperatures, one does not obtain a compact fiber, and, if it is sintered at high temperatures, a heterogeneous mixture is produced since powdery PZT is used. An additional disadvantage of this method is that the fiber thickness is influenced by the bulk density and that thick fibers result. Fine-grained powder, which can be made only by expensive methods, is required to make thinner fibers. Furthermore the fibers must be sintered which requires high temperatures. Fault formation is possible because of the sintering process and fault locations result in the structure which leads to a reduction of the properties.

The replication methods. Carbon fiber mats are soaked in a PZT precursor Sol. After removal of the carbon fibers by combustion at 600° C. a PZT hollow fiber framework or grid results, which is sintered at 1285° C. A spinning process is not involved in the formation of the hollow fiber framework, but instead a dipping process, i.e., a coating process, is used, which is difficult to perform with individual fibers. Furthermore these methods are used at high temperatures, which make the process very cost intensive. Moreover the production of thick fibers is impossible by this coating process. Furthermore the operation of this process is poor and allows only slight variation of the thickness of the resulting fibers.

Another process for making PZT-fibers is described in U.S. Pat. No. 5,072,035. A mixture of $Zr(OPr^n)_4$ and $Ti(OPr^i)_4$ is heated for two hours under reflux in a dry nitrogen atmosphere, reacted with one or more lead organometallic compounds, and heated for at least four additional hours. The liquid mixture is concentrated at 80° C. until a yellow-brown, viscous, resinous mass is produced, from which fibers are drawn. This process is cumbersome, involves considerable effort and is costly because of the requirement of a lengthy reflux time and exclusion of water excluded(under a dry nitrogen atmosphere).

SUMMARY OF THE INVENTION

It is an object of the present invention to provide PZT endless fibers which are mechanically stable, pore-free and thick and have fiber thickness of 10 microns.

It is another object of the present invention to provide a method of preparation of PZT endless fibers which is simple and economical and can be performed without the use of auxiliary spinning devices.

It is an additional object of the present invention to provide a method of making PZT endless fibers which is universally applicable so that a doping of the fibers is possible and also a replacement of the metals Pb, Ti and Zr is possible.

It is a further object of the present invention to provide a method of making PZT endless fibers in which the resulting fibers can have a wide range of thicknesses.

It is a particular object of the invention to provide a suitable spinning mass economically and easily and without the use of auxiliary spinning devices from which endless fibers with widely varying widths and/or fiber thicknesses can be drawn and from which coatings and other molded articles can be made. Furthermore the spinning mass must be storage stable and have a long shelf-life.

It is a general object of the invention to provide a molded article made from PZT and a method and an intermediate product for making it.

According to the invention the molded article based on PZT is made by a method comprising the steps of a) mixing at least one organic zirconium compound of formula I $$Zr(OR^1)_4 \qquad (I)$$

and at least one organic titanium compound of formula II, $$Ti(OR^2)_4, \qquad (II)$$

wherein $R^1$ and $R^2$ are each independently selected from the group consisting of straight, branched and cyclic alkyl groups having 1 to 10 carbon atoms, separately or together with at least one alcohol selected from the group consisting of alcohols of formula III $$R^3-X-R^4-OH, \qquad (III)$$

and alcohols of formula IV $$R^3-CX-R^4-OH; \qquad (IV)$$

wherein $R^3$ is selected from the group consisting of straight chain, branched and cyclic alkyl groups having 1 to 10 carbon atoms, $R^4$ is an alkylene groups having 2 to 4 carbon atoms and X is selected from the group consisting of O, S and $NR^5$ and $R^5$ is selected from the group consisting of hydrogen and alkyl groups having 1 to 4 carbon atoms, to form at least one mixture portion, and wherein 0 to 4 moles of the at least one alcohol are used in the mixing per mole of the at least one organic titanium and zirconium compounds of formulas I and II present in each of the at least one mixture portions;

b) reacting from 1 to 3 moles of at least one carboxylic acid having 2 to 10 carbon atoms per mole of the at least one organic titanium and zirconium compounds of formulas I and II present with each of the at least one mixture portions and/or each of the at least one organic titanium and zirconium compounds separately or together to form at least one reaction mixture;

c) reacting all of the at least one reaction mixtures formed in step b) together with 1 to 1.5 moles of at least one Pb-containing carboxylate per mole of the organic titanium and zirconium compounds present to form a combined mixture, the at least one Pb-containing carboxylate being selected from the group consisting of Pb(II)-carboxylates and Pb(IV)-carboxylates each made from an acid member selected from the group consisting of substituted and unsubstituted, monofunctional and polyfunctional, saturated and unsaturated, straight chain and branched chain, cyclic and aromatic carboxylic acids having 1 to 18 carbon atoms and substituted and unsubstituted, monofunctional and polyfunctional, saturated and unsaturated, straight chain and branched chain, cyclic and aromatic hydroxycarboxylic acids having 1 to 18 carbon atoms;

d) subjecting the combined mixture formed in step c) to a hydrolytic condensation and removing volatile components therefrom until a solid mass is formed at ambient temperatures;

e) heating the solid mass until a viscous liquid is formed;

f) forming the molded article from the viscous liquid; and g) heating the molded article to a temperature of at least 500° C.

It has been unexpectedly been found that the spinning mass according to the invention cannot only be drawn into long fibers or endless fibers, but the mass according to the invention can also be used to make coatings and molded articles of many types. The spinning mass, most generally a mass, is to be understood as an intermediate product for making of the molded article.

The making of the spinning mass according to the invention occurs in such a way that organic zirconium compounds of formula I and organic titanium compounds of formula II together or separately are complexed with the carboxylic acids to form complexed zirconium and titanium compounds, the complexed zirconium and titanium compounds are combined in a mixture and the mixture of the complexed zirconium and titanium compounds is reacted with at least one lead carboxylate and subjected to a hydrolytic condensation.

For example, when acetic acid is used as the carboxylic acid, the titanium and zirconium compounds to be complexed are separated from each other. If a mixture of 0.53 moles of $Zr(OPr^n)_4$ and 0.47 moles of $Ti(OPr^i)_4$ is complexed with 3.0 moles of acetic acid, a porous precipitate arises on addition of e.g. $Pb(OAc)_2 \cdot 3H_2O$, which can be dissolved either by addition of additional acetic acid or by heating. No fibers can be drawn from this mass after removal of the volatile components.

Unexpectedly compounds are obtained in separate reactions of $Zr(OPr^n)_4$ and $Ti(OPr^i)_4$ with acetic acid, which may be mixed in appropriate ratios for forming PZT-material with lead carboxylates, e.g. with $Pb(OAc)_2 \cdot 3H_2O$ without precipitation. After removal of the volatile components under a vacuum produced by an oil pump a viscous liquid, from which fibers of about 1 m in length can be drawn with a glass rod.

Furthermore it was unexpectedly and surprisingly found that in contrast to the case of acetic acid, propionic acid can be added to a mixture of $Zr(OPr^n)_4$ and $Ti(OPr^i)_4$ and that precipitation does not occur on addition of, for example, $Pb(OAc)_2 \cdot 3H_2O$. Further a clear, low viscosity liquid, from which a clear, high viscosity liquid with a PZT-content of 55% is obtained after driving off volatile components at 90° C. and at pressures of 20 hPa. The PZT fiber can be drawn from this high viscosity liquid. A friable solid from which a powder can be made (PZT-content 65%) arises after additional concentration at temperatures of 140° C. and a pressure of 1 hPa, which is surprisingly converted by heating at 150° C. into a clear high viscosity liquid, from which fibers can be drawn with a glass rod.

To establish the suitability of the method for a manufacturing process, spinning experiments were performed in a plant. The friable solid was "melted" at 150° C., pressed at pressure of 150 kPa through a 100 micron orifice and the fiber formed was wound on a rotating cylinder. The winding speed of 120 m/min is attained and fibers up to 600 m long were obtained.

The glass fibers were heated in an hour at 660° C. Unexpectedly melting during the tempering of the fiber no longer occurs so that after the termination of the tempering yellow fibers with a diameter of 10 microns were obtained. X-ray diffraction measurements showed the typical refraction pattern for PZT.

Suitable Zr- or Ti-alcoholates of formula I and/or II are those, in which the alkyl groups have 2 to 6 carbon atoms. These Zr- or Ti-alcoholates provide particularly good results. Examples of suitable Zr- and Ti-alcoholates include $Zr(OPr^n)_4$, $Ti(OPr^i)_4$, $Zr(OBu)_4$ or $Ti(OEt)_4$ without limitation.

In preferred embodiments of the spinning mass according to the invention Zr- and Ti-alcoholates are used with a Zr/Ti molar ratio of 53:47.

Suitable lead carboxylates for making the spinning mass of the invention include e.g. lead adipate, lead benzoate, lead citrate, lead cyclohexane butyrate, lead formate, lead fumarate, lead-12-hydroxystearate, lead lactate, lead linolate, lead maleate, lead naphthenate, lead octanoate, lead oleate, lead oxalate, lead palmitate, lead phthalate, lead salicylate, lead stearate, lead succinate, lead tartarate or lead-2-hydroxy-2methylpropionate. To make the spinning mass according to the invention lead acetates of the formula V are preferred, $$Pb(O-CO-CH_3)_l \cdot mPbO \cdot nH_2O, \qquad (V)$$

in which l=2 to 4, and m=0 to 2 and n=0 to 10. The lead acetates can also include lead (II) acetate, lead (IV) acetate or also basic lead acetates. Also $Pb(O-CO-CH_3)_2 \cdot 3H_2O$ is particularly preferred and provides especially good results. Also e.g. $Pb(O-CO-CH_3)_4$ is particularly preferred.

Water of crystallization present in lead carboxylates provides the advantage that it can be called upon if necessary for hydrolytic condensation. The lead carboxylates, in which the molar lead is from 1 to 1.5 mole, can be added either in stoichiometric amounts or also in excess. A lead excess provides the advantage that the lead loss occurring by PbO volatilization in tempering processes is compensated from the beginning.

It is not necessary to add the lead (II) carboxylate as such to the reaction mixture, but it is also possible to form the lead (II) carboxylate either entirely or in part in situ in the reaction mixture. The lead (II) oxide and at least one additional mole of one or more carboxylic acids per mole of the lead (II) oxide are added to the reaction mixture. If e.g. propionic acid is fed to the PbO, it dissolves completely with the formation of lead propionate and water. Thus in this embodiment of the process the course of the reaction proceeds via a lead carboxylate and hydrolysis.

The lower molecular carboxylic acids for complexing the Ti- and Zr-compounds are added in amounts between 1 and 3 mole for each mole of a total amount of $Zr(OR^1)_4$ and $Ti(OR^2)_4$. The upper limit, 3 mole, is preferred and produces especially good results.

The lower molecular carboxylic acids for complexing $Zr(OR^1)_4$ and $Ti(OR^2)_4$ include carboxylic acids having 2 to 10 carbon atoms such as propionic, valeric, caproic and caprylic acid, or a mixture of the foregoing. These carboxylic acids can be used for separately carboxylating the Ti and Zr-compounds, or for carboxylating a mixture. Particularly good results are obtained with propionic acid or a mixture of caproic and propionic acid. Furthermore the carboxylic acids can also be added in the form of their anhydrides. The carboxylic acids serve not only as carboxylating agents, but they also function as polar solvents.

It was also surprising that only a comparatively little amount of heat was generated so that the use of cooling water could be eliminated.

In other embodiments of the spinning mass according to the invention the Zr- and/or Ti-alcoholates can be subjected to an alcoholysis prior to the carboxylation either separately or as a mixture. Groups, which improve further the spinning properties of the spinning mass according to the invention, can be introduced in this way. Suitable alcohols for this purpose include those having the formulas (III) and (IV):

$$R^3-X-R^4-OH, \qquad (III)$$

and $$R^3-CX-R^4-OH, \qquad (IV)$$

wherein the allowed groups X, $R^3$ and $R^4$ have been defined hereinabove. Between 0 and 4 moles of the compounds of formula III and IV can be used for each mole of the sum total of the compounds I and II, i.e. all 4 ligands of compounds I and/or II can be replaced or exchanged.

Preferred alcohols of formulas III and IV include $i-C_3H_7-O-C_2H_4-OH$, $n-C_4H_9-O-C_2H_4-OH$, $C_2H_5-NH-C_2H_4-OH$, $C_2H_5-S-C_2H_4-OH$, $CH_3-CO-CH_2-OH$, $CH_3-CO-CH(CH_3)-OH$ and $C_2H_5-CO-CH_2-OH$. Particularly good results are obtained with $i-C_3H_7-O-C_2H_4-OH$ and $n-C_4H_9-O-C_2H_4-OH$.

After the carboxylation the mixture of carboxylated Ti- and Zr-compounds and lead carboxylate is subjected to a hydrolytic condensation. This occurs with the help of the water of crystallization present in the lead carboxylate as needed and/or by action of added water or moisture, if necessary with addition of a catalyst and/or a solvent. For controlled hydrolysis an apparatus can be used, which conducts humid air into the mixture with a set partial pressure of water vapor.

After finishing the hydrolytic condensation the volatile components of the mixture are removed in the usual way and a friable solid mass results are room temperature, which has the melt behavior (melting range) of an organic polymer. In this form the spinning mass according to the invention is a friable sold substance which is storage stable and can be handled without difficulty.

The solid, friable mass is heated to make the fibers, coatings or other molded articles, until a highly viscous fluid results, from which fibers can be drawn, coatings applied or molded articles made. To reduce the viscosity, e.g. for coatings, it is also possible to thin the highly viscous liquid with solvent. Suitable solvents for this purpose include alcohols used in the alcoholysis or the hydrolytic condensation. In other cases an undesired alcoholysis cannot be completely prevented, although experiments show that an alcoholysis with isopropoxyethanol or pentadiol had no negative effects on the spin ability, possibly producing a positive effect on the sintering properties. Generally however it is possible to perform the carboxylation, the mixing of the individual components and the hydrolytic condensation also in the presence of solvent. These are removed together with the volatile components produced in the reaction mixture.

After the formation of the molded article the fibers, coatings or molded article are heated to a temperature of at least 500° C. At about 400° C. the "organic" is completely removed and an amorphous mixed oxide is formed, and at about 500° C. the crystallization of the PZT starts. A high heating rate, e.g. at 600° C. or more per hour, is advantageous, since undesired phases does not form at high heating rates.

Unexpectedly it was found that the fibers, coatings or molded articles formed from the high viscosity liquid did not melt again during the temperature increase. This is explained if one hypothesizes that the high viscosity liquid is not a melt of the solid friable mass in the conventional sense. The glass fiber has a 3% higher solids content than the spinning mass. This is because of the evaporation of the volatile components in the spinning process. Possibly this slight material loss is the reason that the glass fiber is not melted again with further increases in temperature.

As already mentioned the piezoelectric properties of PZT are greatly increased by doping. The doping of the fibers, coatings or molded article made from PZT according to the invention occurs by simple mixing of suitable metal alcoholates or carboxylates in the reaction mixture or entirely generally by addition of soluble metal compounds, whose anions can be thermally driven from the material. Suitable metals for that purpose are rare earths, additional alkali metals, and La, Sb, Bi, Nb, W, Ta, Fe, Co, Mn, Ni, Ga, In, Cr, Sc, Ir or Ag.

Sn- or Hf-compounds can be admixed to replace titanium and/or zirconium and lead can be replaced addition of Mg-, Ca-, St- or Ba-compounds.

The fibers, coatings or molded article according to the invention can find use in applications in which they function as ceramic materials in which in the first place their piezoelectric properties are responsive and, in the case of the fibers, do not require very great strength. Sensor and actuator applications are possible based on the piezoelectric properties (changes of the electrical field due to mechanical load). The sensor applications include the detection of material damage (in plastic materials after experiencing impacts). Furthermore PZT-fibers in the form of a net structure, are worked in it (e.g. in airplane wings). The use of PZT-powder is unsuitable or the detection of material damage, since insulated web and/or net structures are required because of the localized definition of the damage.

While the invention has been illustrated and described as embodied in a molded article based on PZT, method and intermediate product for its manufacture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An intermediate product in a method of making a molded article, said intermediate product being made by a method comprising the steps of:

a) providing at least one organic zirconium compound of formula I,

and at least one organic titanium compound of the formula II,

wherein $R^1$ and $R^2$ are each independently selected from the group consisting of straight, branched and cyclic alkyl groups having 1 to 10 carbon atoms;

b) reacting from 1 to 3 moles of at least one carboxylic acid having 2 to 10 carbon atoms per mole of the at least one organic titanium plus the at least one organic titanium compound of formulas I and II present with the at least one organic titanium and the at least one organic zirconium compound to form at least one reaction mixture;

c) reacting said at least one reaction mixture formed in step b) with 1 to 1.5 moles of at least one Pb-containing carboxylate per mole of the at least one organic titanium compound plus the at least one organic zirconium compound to form a combined mixture, the at least one Pb-containing carboxylate being selected from the group consisting of Pb(II)-carboxylates and Pb(IV)-carboxylates, wherein each of said Pb(II)-carboxylates and Pb(IV)-carboxylates is made from an acid member selected from the group consisting of substituted and unsubstituted, monofunctional and polyfunctional, saturated and unsaturated, straight chain and branched chain, cyclic and aromatic carboxylic acids having 1 to 18 carbon atoms and substituted and unsubstituted, monofunctional and polyfunctional, saturated and unsaturated, straight chain and branched chain, cyclic and aromatic hydroxycarboxylic acids having 2 to 18 carbon atoms; and d) subjecting the combined mixture formed in step c) to a hydrolytic condensation and removing volatile components from the combined mixture until a solid mass is formed at ambient temperatures.

2. The intermediate product as defined in claim 1, wherein a molar ratio of titanium to zirconium therein is 47:53.

3. The intermediate product as defined in claim 2, wherein said method further comprises the step of forming said Pb(II) carboxylate at least partially in situ from Pb(II) oxide and at least one other carboxylic acid.

4. The intermediate product as defined in claim 3, wherein said method further comprising the step of forming said carboxylic acids at least partially in situ from at least one carboxylic acid anhydride.

5. The intermediate product as defined in claim 1, wherein the Pb-containing carboxylate includes a lead acetate compound of the formula V

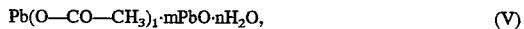

wherein l=2 to 4, m=0 to 2 and n=0 to 10.

6. The intermediate product as defined in claim 1, wherein said method includes the step of doping the at least one reaction mixture with a foreign metal, said foreign metal not including zirconium, titanium or lead.

7. The intermediate product as defined in claim 1, further comprising at least one metal cation member selected from the group consisting of $Mg^{2+}$, $Ca^{2+}$, $Sr^{2+}$ and $Ba^{2+}$, said at least one metal cation member partially replacing said Pb(II).

8. The intermediate product as defined in claim 1, further comprising at least one metal cation member selected from the group consisting of $Sn^{4+}$ and $Hf^{4+}$, said at least one metal cation member partially replacing at least one member selected from the group consisting of $Ti^{4+}$ and $Z^{4+}$.

* * * * *